Patented May 28, 1940

2,202,619

UNITED STATES PATENT OFFICE 2,202,619

COMPOUNDS OF THE CYCLOPENTANOPOLY-HYDROPHENANTHRENE SERIES AND A PROCESS OF PREPARING THEM

Max Bockmühl, Gustav Ehrhart, Heinrich Ruschig, and Walter Aumüller, Frankfort-on-the-Main-Hoechst, Germany, assignors to Winthrop Chemical Company, Inc., New York, N. Y., a corporation of New York No Drawing. Application September 28, 1938, Serial No. 232,094. In Germany October 2, 1937

5 Claims. (Cl. 260—397)

The present invention relates to compounds of the cyclopentanopolyhydrophenanthrene series and to a process of preparing them.

We have found a way to prepare compounds of the following general formula:

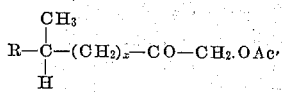

wherein R represents a cyclopentanopolyhydrophenanthrene radical substituted at least by one member of the group consisting of oxo, hydroxyl and esterified hydroxyl, $x$ stands for a member of the group consisting of naught, 1 and 2, and Ac for an acyl radical.

The process consists in transforming a compound of the following general formula:

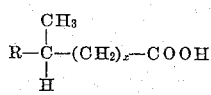

wherein R and $x$ have the above-indicated meaning, into the corresponding acid chloride, causing diazomethane to act upon the acid chloride and transforming the diazoketone thus obtained with the aid of an acid into a corresponding ester. The free carboxylic acid may be converted into the acid chloride according to the usual methods, for instance, by means of thionyl chloride, phosphorus trichloride or phosphorus pentachloride. As the agent for converting diazoketone into a corresponding ester there may be used any organic or inorganic acid, acetic acid comes particularly into consideration for this purpose, but there may also be used, for instance, sulfuric acid, propionic acid, oleic acid, succinic acid or benzoic acid.

The process may advantageously be carried out as follows:

The acid chloride, obtainable from the carboxylic acid used as parent material, for instance, by treatment with thionylchloride, is introduced into an excess of an ethereal diazomethane solution and the whole is allowed to stand until the evolution of nitrogen has ceased. In most cases the diazoketone then separates in the form of crystals. The diazoketone is transformed into the corresponding acetoxymethylketone, for instance, by boiling with glacial acetic acid.

The free hydroxy-compound may be obtained therefrom by saponification. By cautious saponification, however, it is possible to saponify only acyl-oxy-groups present in the polyhydrophenanthrene nucleus; the hydroxy groups thus formed may then be transformed by oxidation into the oxo-groups. By saponification, the ester group in the side chain is also split off.

The products obtained in accordance with the invention may be used as such for therapeutical purposes.

The following examples serve to illustrate the invention, but they are not intended to limit it thereto:

1. 10 grams of dehydrocholic acid and heated together with 30 grams of thionyl chloride and 300 cc. of benzene to boiling. Lively evolution of hydrogen chloride occurs and the substance soon passes into solution. After two hours the dark-colored solution is distilled under reduced pressure, whereby the residue crystallizes. The crystals of the dehydrocholic acid chloride so obtained are triturated with dry acetone and the whole is filtered with suction. The white acid chloride thus purified melts at 208° C. to 209° C. with decomposition.

The dehydrocholic acid chloride is dissolved in dry acetone and the solution is poured into an excess of an ethereal diazomethane solution. Lively evolution of nitrogen occurs. After some time fine needles separate; after standing overnight, they are filtered with suction and dried in a desiccator.

The diazoketone thus obtained is dissolved in dry glacial acetic acid and the whole is heated to boiling for half an hour in a reflux apparatus, whereby nitrogen is evolved. The course of the reaction may be followed by measurement of the volume of evolved nitrogen. The whole is allowed to cool and water is sprayed thereon. The triketonorcholanylacetoxymethylketone separates in the form of long needles which may be recrystallized from acetone, methanol and dilute glacial acetic acid, if necessary, with use of animal charcoal. It melts at 222° C. The yield amounts to 3.5 grams. $C_{27}H_{38}O_6$ calculated:

$C=70.66\%$   $H=8.36\%$ found:

$C=70.48\%$   $H=8.27\%$ 2. 6 grams of acetylnorlithocholic acid (melting at 182° C.) with 22 grams of thionylchloride and 90 cc. of benzene are heated together to boiling in a reflux apparatus for 2½ hours. Lively evolution of hydrogen chloride sets in. After distillation and evaporation by means of benzene the crystallized residue is triturated with acetone and filtered with suction. There is obtained 3-acetoxynorcholanic acid chloride which melts at 153° C.

The acid chloride is dissolved in benzene and the whole is poured into an excess of an ethereal diazomethane solution. The whole is allowed to stand overnight and is then concentrated under reduced pressure and the diazoketone which has separated in the form of crystals is triturated with acetone and filtered with suction.

By boiling for 10 minutes with anhydrous glacial acetic acid nitrogen is split off and the acetoxymethylketone is formed. It may be obtained in the form of fine flat prisms by spraying the cooled glacial acetic acid solution with water. The substance is purified by recrystallization from acetone with use of animal charcoal, or from methanol or the like. It melts at 95° C. The yield amounts to 2.5 grams. $C_{28}H_{44}O_5$ calculated:

$C=72.53\%$  $H=9.64\%$ found:

$C=72.73\%$  $H=9.78\%$ 3. 15 grams of acetoxybisnorcholenic acid, 120 cc. of benzene and 45 grams of thionyl chloride are heated together for 2 hours in a reflux apparatus and the solution is then evaporated under reduced pressure. The residue is then dissolved in 100 cc. of ether and the resulting solution is slowly poured into an ethereal diazomethane solution (400 cc.) prepared from 74 grams of nitrosomethylurea. After a short time the diazoketone crystallizes in the form of beautiful needles. The yield amounts to 8.6 grams. The product decomposes at 153° C. to 154° C.

8.6 grams of the diazoketone are then introduced into 190 cc. of anhydrous glacial acetic acid and the solution is slowly heated to boiling, evolution of nitrogen commencing at 60° C. Water is sprayed on the glacial acetic acid solution, the 3-acetoxyternorcholenyl-acetoxymethyl-ketone thus precipitated is filtered with suction and recrystallized from methanol. The yield amounts to 7.5 grams. The product melts at 159° C.

1 gram of this ester is heated for one hour in a reflux apparatus with 25 cc. of methylalcoholic solution of 5 per cent. strength, the solution is poured into water containing sulfuric acid and the mixture is extracted with ether. The residue of the ethereal solution is recrystallized from acetone. The 3-oxyternorcholenyl-oxymethyl-ketone thus obtained melts at 227.5° C.

1 gram of the 3-acetoxyternorcholenyl-acetoxymethyl-ketone is kept at room temperature for 16 hours in 25 cc. of a methylalcoholic solution of 3 per cent. strength. The solution is then poured into water containing sulfuric acid and the colloidal mixture is extracted by means of ether. The residue of the ethereal solution crystallizes from ethyl acetate and methanol. The 3-oxyternorcholenyl-acetoxymethyl-ketone thus obtained melts at 278° C.

We claim:
1. The process which comprises transforming a compound of the following general formula:

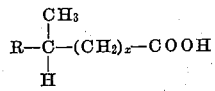

wherein R represents a cyclopentanopolyhydrophenanthrene radical substituted at least by one member of the group consisting of oxo, hydroxyl and esterified hydroxyl and $x$ stands for naught, 1 or 2, into the corresponding acid chloride, causing a diazo methane to act upon the acid chloride and transforming the diazoketones thus obtained with the aid of an acid into an ester.

2. The compounds of the following general formula:

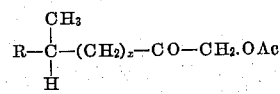

wherein R represents a cyclopentanopolyhydrophenanthrene radical substituted at least by one member of the group consisting of oxo, hydroxyl and esterified hydroxyl, $x$ stands for naught, 1 or 2, and Ac for an acyl radical, said compounds being insoluble in water, soluble in oils and in organic solvents capable of being mixed with water.

3. The compound of the following formula:

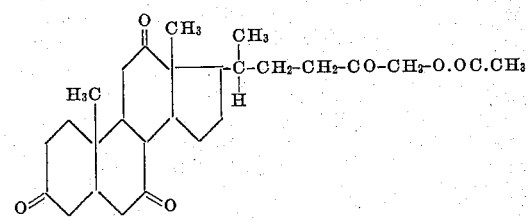

4. The compound of the following formula:

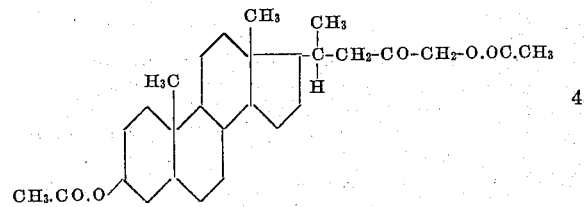

5. The compound of the following formula:

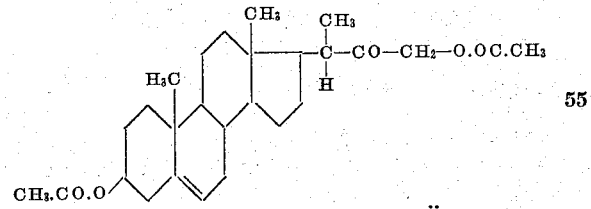

MAX BOCKMÜHL.
GUSTAV EHRHART.
HEINRICH RUSCHIG.
WALTER AUMÜLLER.